(12) United States Patent
Chen et al.

(10) Patent No.: US 10,813,082 B2
(45) Date of Patent: Oct. 20, 2020

(54) TRANSMISSION TIME INTERVAL (TTI) BUNDLING FOR CONTROL CHANNELS IN LONG TERM EVOLUTION (LTE)

(71) Applicant: QUALCOMM Incorporated, San Diego, CA (US)

(72) Inventors: Wanshi Chen, San Diego, CA (US); Hao Xu, San Diego, CA (US); Tingfang Ji, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 14/264,326

(22) Filed: Apr. 29, 2014

(65) Prior Publication Data

US 2015/0029953 A1 Jan. 29, 2015

Related U.S. Application Data

(60) Provisional application No. 61/859,119, filed on Jul. 26, 2013.

(51) Int. Cl.
*H04W 72/04* (2009.01)
*H04L 1/00* (2006.01)
(Continued)

(52) U.S. Cl.
CPC ......... *H04W 72/042* (2013.01); *H04L 1/0046* (2013.01); *H04L 1/0067* (2013.01);
(Continued)

(58) Field of Classification Search
None
See application file for complete search history.

(56) References Cited

U.S. PATENT DOCUMENTS

2010/0316146 A1 12/2010 McBeath et al.
2010/0331030 A1* 12/2010 Nory .................... H04L 5/0053
455/509
(Continued)

FOREIGN PATENT DOCUMENTS

CN 102264135 A 11/2011
CN 102812658 A 12/2012
(Continued)

OTHER PUBLICATIONS

Alcatel-Lucent, Alcatel-Lucent Shanghai Bell, "(E)PDCCH coverage extension for MTC devices", 3GPP TSG-RAN WG1 Meeting #72bis, Chicago, USA, Apr. 15-19, 2013, R1-130941.*
(Continued)

*Primary Examiner* — Joseph A Bednash
(74) *Attorney, Agent, or Firm* — Patterson & Sheridan, L.L.P.

(57) ABSTRACT

Certain aspects of the present disclosure propose techniques for transmission time interval (TTI) bundling for control channels (e.g., physical downlink control channel (PDCCH) and enhanced PDCCH) in long term evolution (LTE). According to certain aspects a method is provided for wireless communications. The method may be performed, for example, by a user equipment (UE). The method generally includes determining a first set of possible decoding candidates for the downlink control channel in a first subframe of the bundle of subframes and a second set of possible decoding candidates for the downlink control channel in a second subframe in the bundle of subframes, wherein the first set of possible decoding candidates and the second set of possible decoding candidates are different and processing the bundle of subframes based, at least in part, on the determination.

28 Claims, 5 Drawing Sheets

(51) Int. Cl.
*H04L 5/00* (2006.01)
*H04L 1/18* (2006.01)

(52) U.S. Cl.
CPC ............ *H04L 1/0072* (2013.01); *H04L 1/189* (2013.01); *H04L 5/0053* (2013.01); *H04L 5/0007* (2013.01)

(56) References Cited

U.S. PATENT DOCUMENTS

| | | | |
|---|---|---|---|
| 2011/0075611 | A1 | 3/2011 | Choi |
| 2011/0083066 | A1* | 4/2011 | Chung .................. H03M 13/09 714/807 |
| 2011/0194500 | A1 | 8/2011 | Kim et al. |
| 2011/0222491 | A1 | 9/2011 | Vajapeyam et al. |
| 2012/0163437 | A1* | 6/2012 | Frederiksen ............ H04L 5/001 375/224 |
| 2013/0301542 | A1* | 11/2013 | Krishnamurthy ..... H04W 52/50 370/329 |
| 2014/0133430 | A1 | 5/2014 | Yang et al. |
| 2014/0185534 | A1 | 7/2014 | Vos et al. |

FOREIGN PATENT DOCUMENTS

| | | |
|---|---|---|
| JP | H11273145 A | 10/1999 |
| JP | 2005025248 A | 1/2005 |
| JP | 2006221232 A | 8/2006 |
| WO | 2013049768 A1 | 4/2013 |
| WO | WO-2014025381 | 2/2014 |

OTHER PUBLICATIONS

3GPP TS 36.213 V11.2.0 (Feb. 2013), 3rd Generation Partnership Project (3GPPTM), Mar. 15, 2013, pp. 116-130.*
NEC, Panasonic, "EPDCCH and PRS", 3GPP TSG-RAN WG1 Meeting #72, St. Julian's, Malta, Jan. 28-Feb. 1, 2013, R1-130771.*
Qualcomm Incorporated, "On collision between and EPDCCH decoding candidate and PSS/SSS/PBCH", 3GPP TSG RAN WG1 #73, May 20-24, 2013 Fukuoka, Japan, R1-132477.*
InterDigital, "EPDCCH reception in PRS subframe", 3GPP TSG RAN WG1 Meeting #72bis, Chicago, USA, Apr. 15-19, 2013, R1-131338.*
NEC Group, "DCI Multiuplexing for E-PDCCH", 3GPP WG1 Meeting #68bis, Jeju, South Korea, Mar. 26-30, 2012, R1-121337 (Year: 2012).*
Research in Motion, UK Limited, "Search Space Design for E-PDCCH", 3GPP TSG RAN WG1 Meeting #68bis, Jeju, Korea, Mar. 26-30, 2012, R1-121478 (Year: 2012).*
NEC Group, "DCI Multiplexing for E-PDCCH", 3GPP WG1 Meeting #68bis, Jeju, South Korea, Mar. 26-30, 2012, R1-121337 (Year: 2012).*
Nokia et al., "eREG / eCCE definition for ePDCCH", 3GPP TSG RAN WG1 Meeting #70, Qingdao, China, Aug. 13-17, 2012, R1-123650 (Year: 2012).*
MediaTek Inc., "Mapping of ePDCCH in presence of other signals", 3GPP TSG-RAN WG1 #69, Prague, Czech Republic, May 21-25, 2012, R1-122165 (Year: 2012).*
CMCC, "Discussion on the Support of Common Search Space on ePDCCH", 3GPP TSG RAN WG1 Meeting #68bis, Jeju, Korea, Mar. 26-30, 2012, R1-121715 (Year: 2012).*
Qualcomm Europe, "Confusing multiple PDCCH aggregation levels", 3GPP TSG-RAN WG1 #53bis, Jun. 30-Jul. 4, 2008, Warsaw, Poland, R1-082544 (Year: 2008).*
Nokia, "Tree Structure for the DL Control Channel"; 3GPP TSG RAN WG1 Meeting #48bis, St Julians, Malta, Mar. 26-30, 2007, R1-071683 (Year: 2007).*
LG Electronics: "PDSCH/PUSCH/(E)PDCCH and DMRS Enhancement for Coverage-limiting UEs (R1-131297)", 3GPP Draft, vol. RAN WG1, No. #72bis, Apr. 6, 2013 (Apr. 6, 2013), XP050697174, 650, Route Des Lucioles; F-06921 Sophia-Antipolis Cedex; France, Retrieved from the Internet: URL:http://www.3gpp.org/ftp/tsg_ran/WG1_RL1/TSGR1_72b/Docs/[retrieved on Apr. 6, 2013].
Partial International Search Report—PCT/US2014/036106—ISA/EPO—dated Aug. 13, 2014.
Qualcomm Incorporated: "Coverage enhancements for (e)PDCCH/PUCCH (R1-140448)", 3GPP Draft, vol. RAN WG1, No. #76, Feb. 1, 2014 (Feb. 1, 2014), XP050752046, 650, Route Des Lucioles; F-06921 Sophia-Antipolis Cedex; France, Retrieved from the Internet: URL:http://www.3gpp.org/ftp/tsg_ran/WG1_RL1/TSGR1_76/Docs/[retrieved on Feb. 1, 2014].
International Search Report and Written Opinion—PCT/US2014/036106—ISA/EPO—dated Nov. 6, 2014.
European Search Report—EP17173146—Search Authority—The Hague—dated Aug. 2, 2017.
Samsung: "(E)PDCCH Coverage Enhancements for low-cost MTC", 3GPP TSG-RAN WG1#72b R1-131017, Apr. 19, 2013, 2 Pages, URL:http://www.3gpp.org/ftp/tsg_ran/WG1_RL1/TSGR1_72b/Docs/R1-131017.zip.
Alcatel-Lucent, et al., "Feasibility of Coverage Extension of Physical Channels for MTC Devices", 3GPP TSG-RAN WG1 Meeting #72, 3GPP Draft; R1-130462—REL-12 MTC Coverage—Coverage EXT PHY Channels V0.3, 3rd Generation Partnership Project (3GPP), Mobile Competence Centre; 650, Route Des Lucioles; F-06921 Sophia-Antipolis C, vol. RAN WG1, No. St Julian; Jan. 28-Feb. 1, 2013, Jan. 19, 2013 (Jan. 19, 2013), 7 Pages, XP050663744, Retrieved from the Internet URL: http://www.3gpp.org/ftp/tsg_ran/WG1_RL1/TSGR1_72/Docs/R1-130462.zip [retrieved on Jan. 19, 2013], Paragraph [04.4], Introduction; p. 1. paragraph 1, PRACH; p. 3. paragraph 3.2, PUSCH; p. 3, paragraph 3.3—p. 4, PDSCH; p. 5. paragraph 4.4, PDCCH/EPDCCH; p. 5. paragraph 4.5—p. 6.
"LTE; Evolved Universal Terrestrial Radio Access (E-UTRA); Physical Channels and Modulation (3GPP TS 36.211 version 10.5.0 Release 10)", (Jul. 2012) 103 Pages.
European Search Report—EP20155476—Search Authority—The Hague—dated May 7, 2020.

* cited by examiner

TRANSMISSION TIME INTERVAL (TTI) BUNDLING FOR CONTROL CHANNELS IN LONG TERM EVOLUTION (LTE)

CLAIM OF PRIORITY UNDER 35 U.S.C. § 119

This application claims benefit of U.S. Provisional Patent Application Ser. No. 61/859,119, filed Jul. 26, 2013, which is herein incorporated by reference in its entirety.

BACKGROUND

I. Field

Certain embodiments of the present disclosure generally relate to wireless communications and, more particularly, to transmission time interval (TTI) bundling for control channels (e.g., physical downlink control channel (PDCCH) and enhanced PDCCH) in long term evolution (LTE).

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) and/or frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station. In an FDD system, forward and reverse link transmissions are on different frequency regions.

Main focus of the traditional LTE design is on the improvement of spectral efficiency, ubiquitous coverage, enhanced quality of service (QoS) support, and the like. This typically results in high end devices, such as the state-of-art smart phones, tablets, etc. However, low cost, low rate devices need to be supported as well. Some market projections show that the number of low cost devices may largely exceed number of today's cell phones.

A study item on provision of low-cost MTC (machine type communications) UEs based on LTE was done in LTE Rel-11. Particularly, the following items are under study: reduction of maximum bandwidth, single receive RF chain, reduction of peak rate, reduction of transmit power, half duplex operation.

Since the intended data rate for the low cost device is less than 100 kbps, it is possible to operate the device only at narrowband width to reduce the cost. Two operation scenarios may be considered. One straight-forward deployment scenario is to set aside some narrow bandwidth, e.g. 1.25 MHz, to support the MTC operations. No standard changes are necessary for such operations. Another, more interesting scenario is to operate low cost UEs in a large bandwidth. In this case, low cost UEs may co-exist with regular UEs. Two possible scenarios may be considered for operation of low cost UEs in a large bandwidth. In one scenario, low cost UEs may operate over the whole available bandwidth (e.g., up to 20 MHz). This scenario may not have any impact on the standards, but it may not be helpful in reducing cost and battery power consumption. In another scenario, low cost UEs may operate over a small portion of the bandwidth.

SUMMARY

Techniques and apparatus are provided herein for transmission time interval (TTI) bundling for control channels (e.g., physical downlink control channel (PDCCH) and enhanced PDCCH) in long term evolution (LTE). "LTE" may refer to LTE and LTE-Advanced (LTE-A).

Certain aspects of the present disclosure provide a method for processing a downlink control channel sent as a bundled transmission over a bundle of subframes by a user equipment (UE). The method generally includes determining a mapping between a first set of possible decoding candidates for the downlink control channel in a first subframe of the bundle of subframes and a second set of possible decoding candidates for the downlink control channel in a second subframe in the bundle of subframes and processing the bundle of subframes based, at least in part, on the determination.

Certain aspects of the present disclosure provide a method for processing a downlink control channel sent as a bundled transmission over a bundle of subframes by a user equipment (UE). The method generally includes determining how to perform rate matching for the downlink control channel in different subframes of the bundle of subframes and processing the bundle of subframes based, at least in part, on the determination.

Certain aspects of the present disclosure provide an apparatus for processing a downlink control channel sent as a bundled transmission over a bundle of subframes by a user equipment (UE). The apparatus generally includes means for determining a mapping between a first set of possible decoding candidates for the downlink control channel in a first subframe of the bundle of subframes and a second set of possible decoding candidates for the downlink control channel in a second subframe in the bundle of subframes and means for processing the bundle of subframes based, at least in part, on the determination.

Certain aspects of the present disclosure provide an apparatus for processing a downlink control channel sent as a bundled transmission over a bundle of subframes by a user equipment (UE). The apparatus generally includes at least one processor configured to determine a mapping between a first set of possible decoding candidates for the downlink control channel in a first subframe of the bundle of subframes and a second set of possible decoding candidates for the downlink control channel in a second subframe in the bundle of subframes and process the bundle of subframes based, at least in part, on the determination. The apparatus generally also includes a memory coupled to the at least one processor.

Certain aspects of the present disclosure provide a computer-readable storage media comprising program instructions to implement a wireless communication system. The storage media generally includes program instructions that determine a mapping between a first set of possible decoding candidates for the downlink control channel in a first subframe of the bundle of subframes and a second set of possible decoding candidates for the downlink control channel in a second subframe in the bundle of subframes and program instructions that process the bundle of subframes based, at least in part, on the determination.

Certain aspects of the present disclosure provide an apparatus for processing a downlink control channel sent as a bundled transmission over a bundle of subframes by a user equipment (UE). The apparatus generally includes means for determining how to perform rate matching for the downlink control channel in different subframes of the bundle of subframes and means for processing the bundle of subframes based, at least in part, on the determination.

Certain aspects of the present disclosure provide an apparatus for processing a downlink control channel sent as a bundled transmission over a bundle of subframes by a user equipment (UE). The apparatus generally includes at least one processor configured to determine how to perform rate matching for the downlink control channel in different subframes of the bundle of subframes and process the bundle of subframes based, at least in part, on the determination. The apparatus generally also includes a memory coupled with the at least one processor.

Certain aspects of the present disclosure provide a computer-readable storage media comprising program instructions to implement a wireless communication system. The storage media generally includes program instructions that determine how to perform rate matching for the downlink control channel in different subframes of the bundle of subframes; and program instructions that process the bundle of subframes based, at least in part, on the determination.

Certain aspects of the present disclosure provide a method for sending a downlink control channel as a bundled transmission over a bundle of subframes by a base station (BS). The method generally includes determining a mapping between a first set of possible decoding candidates for the downlink control channel in a first subframe of the bundle of subframes and a second set of possible decoding candidates for the downlink control channel in a second subframe in the bundle of subframes and sending the bundle of subframes based, at least in part, on the determination.

Certain aspects of the present disclosure provide an apparatus for sending a downlink control channel as a bundled transmission over a bundle of subframes by a base station (BS). The apparatus generally includes means for determining a mapping between a first set of possible decoding candidates for the downlink control channel in a first subframe of the bundle of subframes and a second set of possible decoding candidates for the downlink control channel in a second subframe in the bundle of subframes and means for sending the bundle of subframes based, at least in part, on the determination.

Certain aspects of the present disclosure provide an apparatus for sending a downlink control channel as a bundled transmission over a bundle of subframes by a base station (BS). The apparatus generally includes at least one processor configured to determine a mapping between a first set of possible decoding candidates for the downlink control channel in a first subframe of the bundle of subframes and a second set of possible decoding candidates for the downlink control channel in a second subframe in the bundle of subframes and send the bundle of subframes based, at least in part, on the determination.

Certain aspects of the present disclosure provide a computer-readable storage media comprising program instructions to implement a wireless communication system. The storage media generally includes program instructions that determine a mapping between a first set of possible decoding candidates for the downlink control channel in a first subframe of the bundle of subframes and a second set of possible decoding candidates for the downlink control channel in a second subframe in the bundle of subframes and send the bundle of subframes based, at least in part, on the determination.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
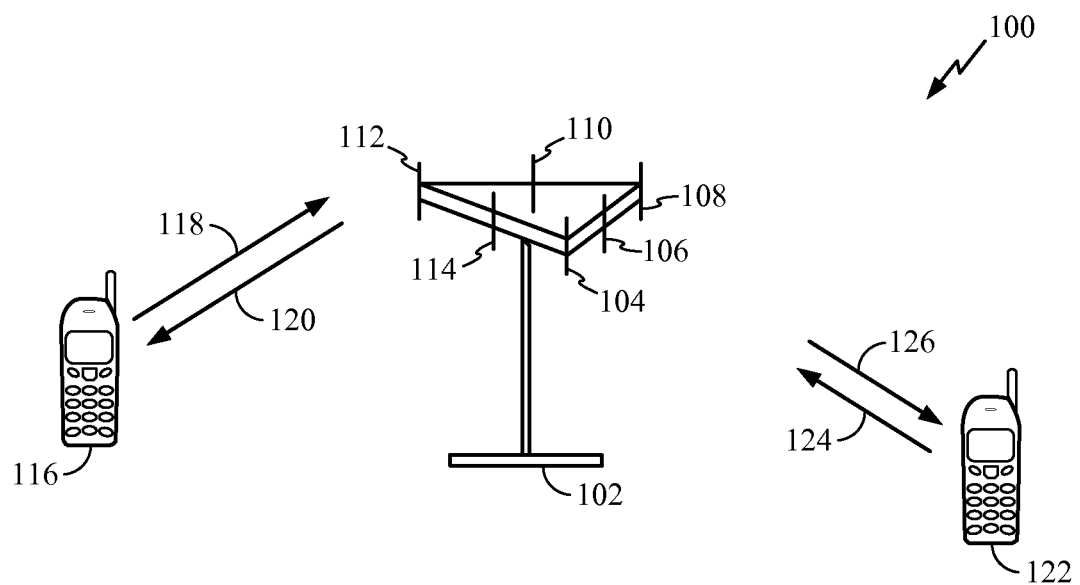
FIG. 1 illustrates a multiple access wireless communication system, in accordance with certain embodiments of the present disclosure.

Techniques are provided herein for transmission time interval (TTI) bundling for control channels (e.g., physical downlink control channel (PDCCH) or enhanced PDCCH) in long term evolution (LTE). According to certain aspects, decoding candidates in the bundled subframes may be identified. Different subframes may have different decoding candidates based on different aggregation levels supported in the different subframes, different number of possible decoding candidates, subframe configuration, or whether the control channel is PDCCH or EPDCCH. The subframes in the bundle may be processed differently if the decoding candidates are different. For example, certain subframes or certain decoding candidates may be ignored for monitoring/decoding. In another example, an aggregation level in one of the bundled subframes may be enforced across the bundled subframes or may be mapped to an aggregation level supported in another subframe in the bundle.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as but not limited to hardware, software/firmware, a combination of hardware and software/firmware, or software/firmware in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a smart phone, a tablet, an ultrabook, a netbook, a smartbook, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE/LTE-Advanced (LTE-A), and LTE/LTE-A terminology is used in much of the description below. It should be noted that the LTE terminology is used by way of illustration and the scope of the disclosure is not limited to LTE. Rather, the techniques described herein may be utilized in various applications involving wireless transmissions, such as personal area networks (PANs), body area networks (BANs), location, Bluetooth, GPS, UWB, RFID, and the like. Further, the techniques may also be utilized in wired systems, such as cable modems, fiber-based systems, and the like.

Single carrier frequency division multiple access (SC-FDMA), which utilizes single carrier modulation and frequency domain equalization has similar performance and essentially the same overall complexity as those of an OFDMA system. SC-FDMA signal may have lower peak-to-average power ratio (PAPR) because of its inherent single carrier structure. SC-FDMA may be used in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

An Example Wireless Communications System

Referring to FIG. 1, a multiple access wireless communication system 100 according to one aspect is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 104, where antennas 106 and 104 transmit information to access terminal 122 over forward link 126 and receive information from access terminal 122 over reverse link 124. In a Frequency Division Duplex (FDD) system, communication links 118, 120, 124 and 126 may use a different frequency for communication. For example, reverse link 118 may use a different frequency than that used by forward link 120.

Each group of antennas and/or the area in which they are designed to communicate is often referred to as a sector of the access point. In an aspect, antenna groups each are designed to communicate to access terminals in a sector of the areas covered by access point 102.

In communication over forward links 120 and 126, the transmitting antennas of access point 102 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology. For certain aspects, either the AP 102 or the access terminals 116, 122 may utilize the proposed interference cancellation technique to improve performance of the system.

Figure 2:
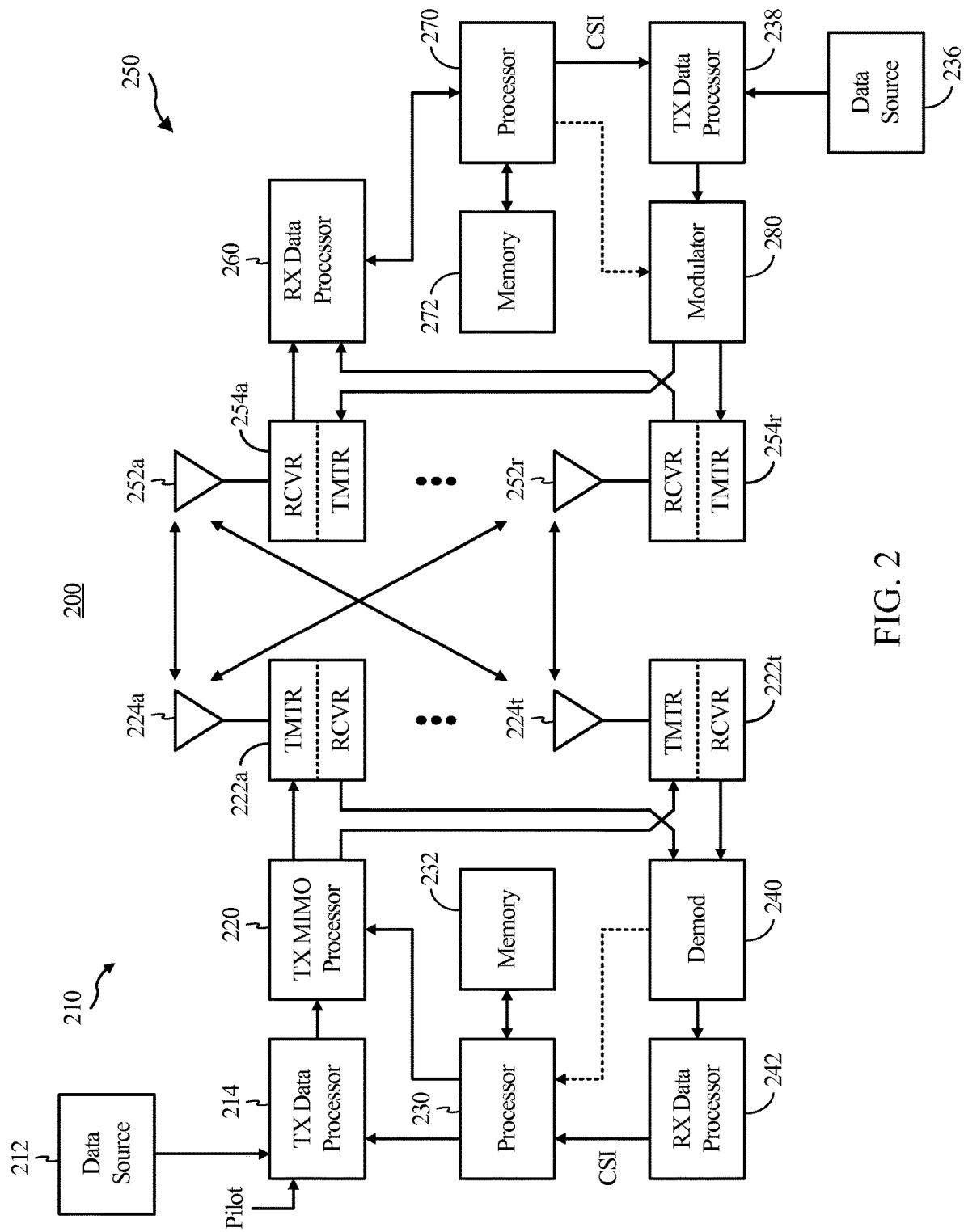
FIG. 2 illustrates a block diagram of a communication system, in accordance with certain embodiments of the present disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214. Embodiments of the present disclosure are also applicable to a wireline (wired) equivalent system of FIG. 2. Both transmitter system 210 and receiver system 250 may transmit and receive (for example, as outlined below).

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M may be a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210. As described in further detail below, the RX data processor 260 may utilize interference cancellation to cancel the interference on the received signal.

Processor 270, coupled to a memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

Example TTI Bundling for Control Channels in LTE

In certain systems (e.g., long term evolution (LTE) Releases 8-10), transmission time interval (TTI) (or subframe) bundling can be configured on a per user equipment (UE) basis. The subframe bundling operation may be configured by the parameter ttiBundling provided by higher layers.

If TTI bundling is configured for a UE, the subframe bundling operation may only be applied to uplink (UL) shared channel (SCH)—not applied to other UL signals/traffic (e.g., uplink control information (UCI)). The bundling size may be fixed at 4 subframes. That is, physical uplink shared channel (PUSCH) may be transmitted in 4 consecutive subframes. The same hybrid automatic repeat request (HARQ) process number may be used in each of the bundled subframes. The resource allocation size may be restricted to up to 3 resource blocks (RBs). The modulation order may be set to 2 (e.g., QPSK). A bundle may be treated as a single resource, for example, a single grant and a single HARK acknowledgement (ACK) may be used for each bundle.

TTI Bundling may mainly be used for low rate traffic. If voice over internet protocol (VoIP) packets are not transmitted in a single TTI due to a low link budget for uplink, Layer 2 (L2) segmentation may be applied. For example, a VoIP packet may be segmented in four radio link control (RLC) protocol data units (PDUs) that are transmitted in four consecutive TTIs and two or three HARQ retransmissions may be targeted to achieve sufficient coverage. However, this approach may have some drawbacks. For example, each additional segment may introduce a one byte RLC, one byte medium access control (MAC), and three byte L1 cyclic redundancy check (CRC) overhead, (e.g., 15% overhead assuming a 33 byte RLC service data unit (SDU) size). This means that for four segments, there may be an additional L1/L2 overhead of 45%.

In addition, HARQ transmissions/retransmissions for every segment may require grants on physical downlink control channel (PDCCH), which may consume significant PDCCH resources. Each HARQ transmission or retransmission may be followed by HARQ feedback on physical HARQ indicator channel (PHICH). Assuming a NACK-ACK error ratio of $10^{-3}$, the large number of HARQ feedback signals may lead to high packet loss probabilities. For example, if twelve HARQ feedback signals are sent, the HARQ feedback error ratio may be on the order of $1.2*10^{-2}$. Packet loss rates of more than $10^{-2}$ may not be acceptable for VoIP traffic.

In TTI bundling, usage of only a single uplink grant and a single PHICH signal per TTI bundle may be advantageous. Also the L1 and L2 overhead may be minimized since no L2 segmentation is required.

Coverage improvements for medium data rate PUSCH and UL VoIP may be desirable. The minimum gain for consideration of specifying the potential solution may be 1 dB for both medium data rate PUSCH and UL VoIP. Potential solutions are TTI bundling enhancements for medium data rate and VoIP, while considering L1/Higher layer protocols overhead and latency.

In addition to low cost, a 15 dB to 20 dB coverage enhancement may be desired to cover devices (e.g., machine type communications (MTC) devices) in low coverage areas (e.g., in the basement). Large TTI bundling size (e.g., in order of 100 subframes) may be one possible solution to address UL coverage enhancements. Large TTI bundling size may possibly be considered for downlink (DL) coverage enhancements as well.

On the DL, TTI bundling has been proposed for physical broadcast channel (PBCH), PDCCH, enhanced PDCCH (EPDCCH), PHICH, and physical downlink shared channel (PDSCH). On the UL, TTI bundling has been proposed for random access channel (RACH), physical uplink control channel (PUCCH), and PUSCH.

For TTI bundling for PDCCH and EPDCCH it may be desirable to link a decoding candidate in one subframe with another candidate in a different subframe of the same bundle. In some cases, a give aggregation level may be supported in one subframe, but may not be supported in another subframe. For example, aggregation levels may become unavailable due to resource availability change (e.g., different PCFICH values, different availability of resources for EPDCCH—in particular the parameter $n_{EPDCCH}$ which captures the number of available resource elements (REs) for EPDCCH in a physical resource block (PRB) pair). In some cases the entire search space is unavailable in a subframe during a bundled transmission. A UE may monitor both PDCCH and EPDCCH in different subframes at least for UE-specific search space. It may be desirable to carefully design rate matching for bundled PDCCH and/or EPDCCH.

Accordingly, what is desired are techniques for TTI bundling for PDCCH and EPDCCH which may address the above issues.

Techniques are provided herein for transmission time interval (TTI) bundling for PDCCH and EPDCCH in LTE. According to certain aspects, decoding candidates in bundled subframes may be identified. Different subframes may have different decoding candidates based on different aggregation levels supported in the different subframes, different number of possible decoding candidates, subframe configuration, or whether the control channel is PDCCH or EPDCCH. The subframes in the bundle may be processed differently if the decoding candidates are different. For example, certain subframes or certain decoding candidates may be ignored for monitoring/decoding. In another example, an aggregation level in one of the bundled subframes may be enforced across the bundled subframes or may be mapped to an aggregation level supported in another subframe in the bundle.

Decoding Candidate Linkage in a TTI Bundle

According to certain aspects, decoding candidates may be linked (e.g., a candidate in one subframe linked to a candidate in a different subframe). In aspects, decoding candidate linkage may be based on search space (e.g., common vs. UE-specific), aggregation levels, decoding candidates within an aggregation level, EPDCCH resource set in the case of EPDCCH, availability of certain aggregation levels, downlink control information (DCI) formats, control channel type (e.g., PDCCH or EPDCCH), or some combination thereof. In one example, one straightforward linkage of decoding candidates over different subframes for the same bundle may be of a same search space, a same aggregation level, a same decoding candidate index with the aggregation level, a same resource set—if EPDCCH, a same DCI format, and a same control channel type. However, it may desirable to handle some special cases.

Special Cases

According to certain aspects, in one example, a decoding candidate with PDCCH bundling may have aggregation level 8. Accordingly, 8 control channel elements (CCEs) for PDCCH may be available in a first subframe in the bundle, but not available in a second subframe in the bundle. In aspects, the second subframe from the bundled transmission may be ignored, but the candidate may still be decoded/monitored in the remaining subframes where the 8 CCEs are available. Alternatively, the decoding candidate may be entirely ignored. That is, as long as the decoding candidate has incomplete transmission opportunities, the candidate may be ignored by the UE for decoding.

According to certain aspects, a decoding candidate with EPDCCH bundling may have an aggregation level L in a first subframe with a first number of available resources (e.g., $n_{EPDCCH}$ is equal or great than 104), but in a second subframe of the same bundle there may be less available resources (e.g., $n_{EPDCCH}$ is less than 104). The parameter $n_{EPDCCH}$ denotes for a particular UE the number of downlink resource elements in a physical resource-block pair available for EPDCCH in the first EPDCCH resource set (a UE may be configured with more than one EPDCCH resource set). Due to the different values of $n_{EPDCCH}$ in the first and second subframes of the bundle, the set of aggregation levels in the first subframe supported by the UE may be different from the set of aggregation levels in the second subframe supported by the UE. Additionally, there may not be a one-to-one mapping. For example, an aggregation level in the first frame may not find a corresponding aggregation level in the second frame due to a resource constraint of an EPDCCH resource set.

According to certain aspects, the same aggregation level across subframes in the bundle may be enforced regardless of $n_{EPDCCH}$. Alternatively, a one-to-one mapping may be specified between an aggregation level L1 in the first subframe and an aggregation level L2 in the second subframe (e.g., level 1 in first subframe corresponding to level 2 in the second subframe, level 2 in the first subframe corresponding to level 4 in the second subframe, etc.). More generally, a one-to-one mapping may be specified between a decoding candidate in the first subframe and a decoding candidate in the second subframe, where the two decoding candidates may or may not have a same aggregation level. If there is no corresponding decoding candidate in one of the two subframes, the decoding candidate under EPDCCH bundle can either ignore the corresponding subframe or ignore the decoding candidate entirely.

According to certain aspects, an EPDCCH bundle may have aggregation level L in a first subframe. The EPDCCH bundle may have regular subframe configuration or special subframes configurations other than 3/4/8. A second subframe in the EPDCCH bundle may be a special subframe (e.g., time division duplexed (TDD)) with configuration 3/4/8). The set of aggregation levels in the first subframe which may be supported by the UE may be different from the set of aggregation levels in the second subframe which may be supported by the UE. In certain aspects, the same aggregation level may be enforced across subframes in the bundle. Alternatively, a one-to-one mapping may be specified between an aggregation level L1 in the first subframe and an aggregation level L2 in the second subframe. More generally, a one-to-one mapping may be specified between a decoding candidate in the first subframe and a decoding candidate in the second subframe, where the two decoding candidates may or may not have a same aggregation level. If there is no corresponding decoding candidate in one of the two subframes, the decoding candidate under EPDCCH bundle can either ignore the corresponding subframe or ignore the decoding candidate entirely.

According to certain aspects, EPDCCH in a subframe may be skipped by the UE for monitoring/decoding due to other signals. For example, due to multimedia broadcast multicast service (MBMS) transmissions, EPDCCH may be skipped and the UE may monitor regular PDCCH instead. As another example, due to position reference signal (PRS) transmissions of different cyclic prefix (CP), EPDCCH may be skipped. In certain aspects, the UE behavior may be such that the corresponding subframe is skipped from the bundled transmission. However, it may not be reasonable to completely skip all EPDCCH decoding candidates if some subframes in the bundle cannot carry EPDCCH.

According to certain aspects, a UE may be configured to monitor PDCCH UE-specific search space (UESS) in a first subframe and EPDCCH UESS in a second subframe. Some linkage between PDCCH decoding candidates and EPDCCH decoding candidates can be done. However, it may be complicated, especially given PDCCH is CRS based and EPDCCH is UE-RS based. Instead, bundled control transmissions may be done separately for PDCCH or EPDCCH. For simplification, UEs may monitor only one type of control channel under bundled transmissions for each search space. For example, a UE may only monitor either bundled common search space on PDCCH and bundled UESS on PDCCH or bundled common search space on PDCCH and bundled UESS on EPDCCH—the UE may not monitor bundled common search space on PDCCH, bundled UESS on PDCCH, and bundled UESS on EPDCCH.

According to certain aspects, for bundled control channel rate matching, rate matching for each subframe in the same bundle may be done separately. Alternatively, rate matching for subframes in the same bundle may be jointly performed. For jointly performed rate matching, rate matching of a first subframe in a bundle may depend on rate matching of a second subframe in the bundle. The most straightforward way may be to treat all the resources in the bundled subframe as a whole for rate matching. Performing rate matching separately for each subframe may be simpler than jointly performing rate matching, however, joint rate matching may have some limited performance benefits.

Figure 3:
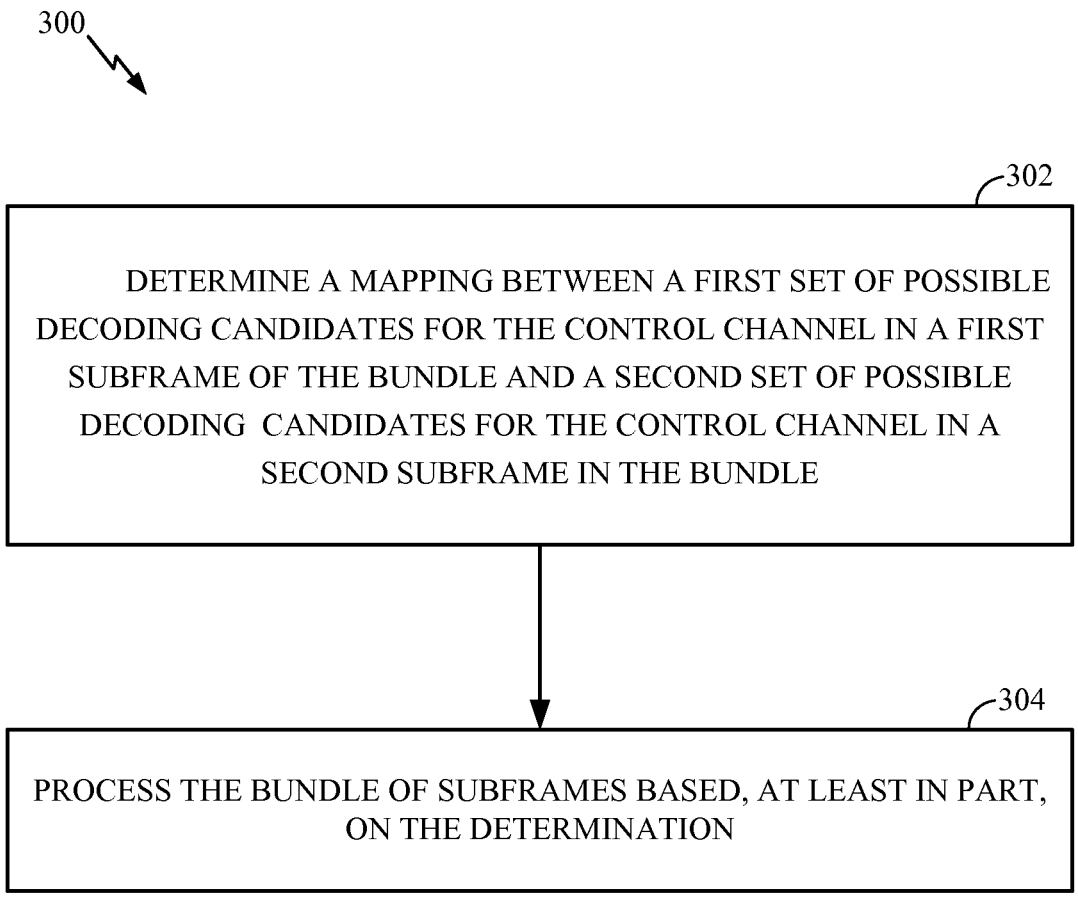
FIG. 3 illustrates example operations for processing a downlink control channel sent as a bundled transmission over a bundle of subframes by a user equipment (UE), in accordance with certain embodiments of the present disclosure.

FIG. 3 illustrates example operations 300 for processing a downlink control channel (e.g., PDCCH or EPDCCH) sent as a bundled transmission over a bundle of subframes, in accordance with certain aspects of the present disclosure. The operations 300 may be performed, for example, by a UE (e.g., similar to AT 116). The operations 300 may begin, at 302, by determining a mapping between a first set of possible decoding candidates for the downlink control channel in a first subframe of the bundle of subframes and a second set of possible decoding candidates for the downlink control channel in a second subframe in the bundle of subframes.

In aspects, the first set of possible decoding candidates may be different than the second set of possible decoding candidates. In aspects, the UE may determine decoding candidates in the first set of possible decoding candidates that are not in the second set of possible decoding candidates. In aspects, the UE may ignore the second subframe of the bundle of subframes for decoding and decode the determined decoding candidates in the first subframe of the bundle of subframes. Alternatively, the UE may ignore, in the first subframe of the bundle of subframes and the second subframe of the bundle of subframes, the determined decoding candidate.

In aspects, a decoding candidate of an aggregation level in the first set of possible decoding candidates may be mapped to a decoding candidate of the same aggregation level in the second set of possible decoding candidates. In aspects, a first decoding candidate in the first set of possible decoding candidates may be mapped to a second decoding candidate in the second set of possible decoding candidates. The first decoding candidate and the second decoding candidate may have different aggregation levels, different number of decoding candidates for an aggregation level, or different types of control channel.

In aspects, where the downlink control channel is a PDCCH, the UE may determine the mapping between the first set of possible decoding candidates and the second set of possible decoding candidates based on a number of available CCEs in the subframes. Where the downlink control channel is an EPDCCH, the UE may determine an aggregation level supported in the subframes based on a number of REs available for the EPDCCH in a PRB pair. In aspects, the downlink control channel may be an EPDCCH that is configured with a first EPDCCH resource set and a second EPDCCH resource set. The UE may determine a first mapping within the first EPDCCH resource set and determine a second mapping within the second EPDCCH resource set.

According to certain aspects, the UE may monitor decoding candidates in a common search space (CSS) and a UE-specific search space (USS). The UE may determine a first mapping within the CSS and may determine a second mapping within the USS.

According to certain aspects, the UE may determine a first mapping within PDCCH and may determine a second mapping within EPDCCH.

According to certain aspects, a configuration (e.g., subframe type or a number of symbols for downlink transmission in a subframe) of the first subframe may be different from a configuration of the second subframe. The UE may determine the mapping based on the configuration of the first subframe and the configuration of the second subframe.

At 304, the UE may process the bundle of subframes based, at least in part, on the determination. In aspects, the UE may determine the mapping based on a presence of other signals (e.g., MBMS or PRS) in the subframes. In aspects, the UE may ignore at least some of the decoding candidates in at least one subframe in the bundle of subframes.

Figure 4:
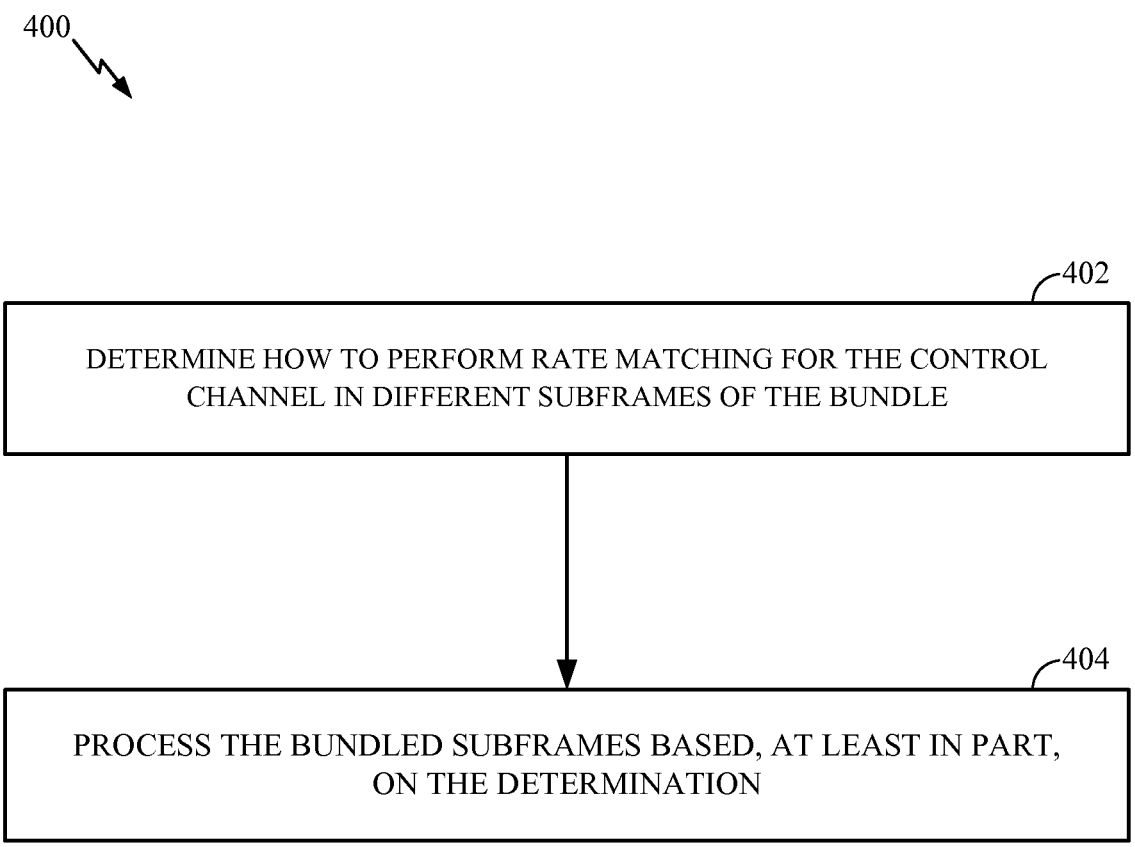
FIG. 4 illustrates example operations for processing a downlink control channel sent as a bundled transmission over a bundle of subframes by a user equipment (UE), in accordance with certain embodiments of the present disclosure.

FIG. 4 illustrates example operations 400 for processing a downlink control channel sent as a bundled transmission over a bundle of subframes, in accordance with certain embodiments of the present disclosure. The operations 400 may be performed, for example, by a UE (e.g., similar to AT 116). The operations 400 may begin, at 402, by determining how to perform rate matching for the downlink control channel in different subframes of the bundle of subframes.

At 404, the UE may process the bundle of subframes based, at least in part, on the determination. For example, the UE may perform rate matching separately for each subframe in the bundle of subframes. Alternatively, the UE may perform rate matching jointly for each subframe in the bundle of subframes.

Figure 5:
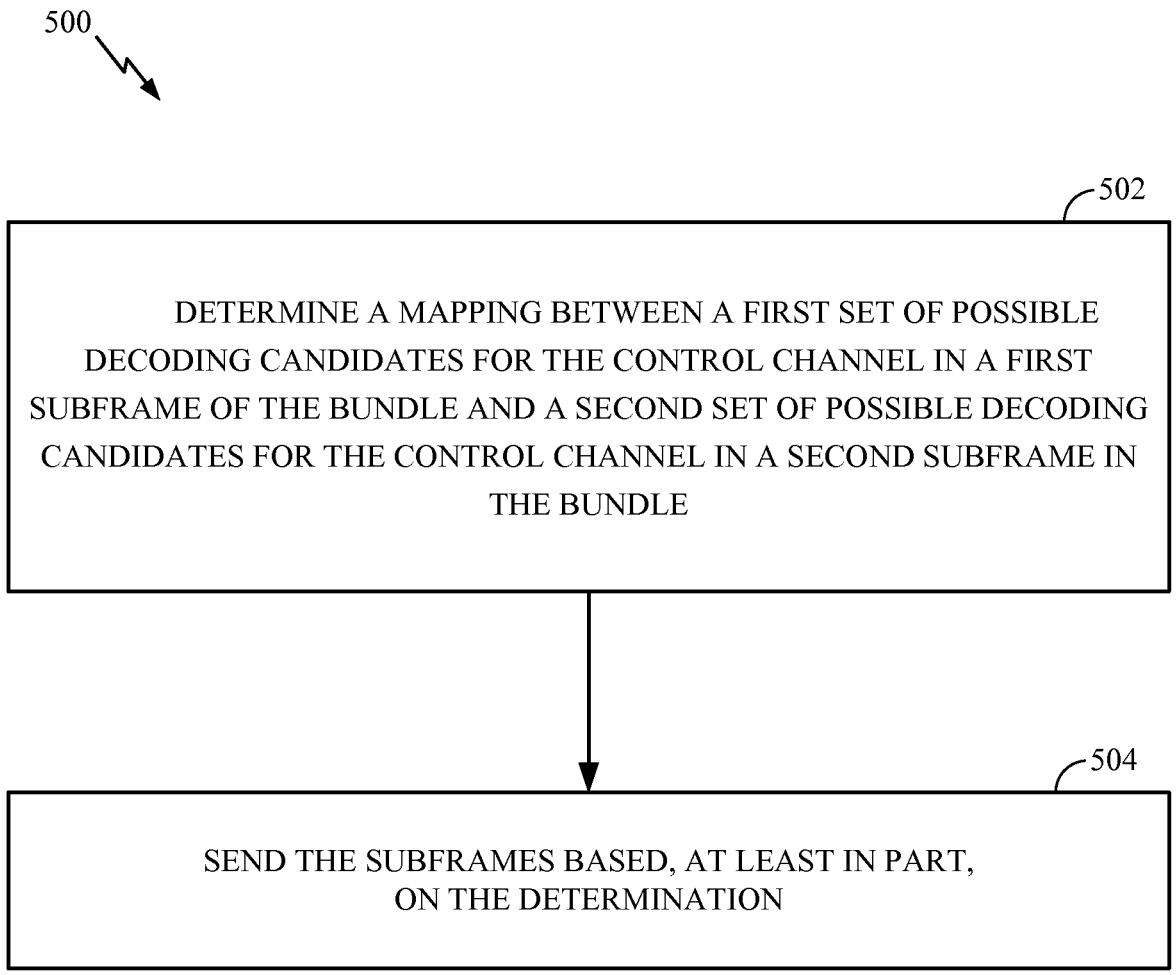
FIG. 5 illustrates example operations for sending a downlink control channel as a bundled transmission over a bundle of subframes by an e Node B (eNB), in accordance with certain embodiments of the present disclosure.

FIG. 5 illustrates example operations 500 for sending a downlink control channel (e.g., PDCCH or EPDCCH) as a bundled transmission over a bundle of subframes, in accordance with certain aspects of the present disclosure. The operations 500 may be performed, for example, by an eNB (e.g., AP 102). The operations 500 may begin, at 502, by determining a mapping between a first set of possible decoding candidates for the downlink control channel in a first subframe of the bundle and a second set of possible decoding candidates for the downlink control channel in a second subframe in the bundle of subframes. In aspects, the first set of possible decoding candidates and the second set of possible decoding candidates may be different.

According to certain aspects, a decoding candidate of an aggregation level in the first set of possible decoding candidates may be mapped to a decoding candidate of the same aggregation level in the second set of possible decoding candidates. In aspects, a first decoding candidate in the first set of possible decoding candidates may be mapped to a second decoding candidate in the second set of possible decoding candidates. The first decoding candidate and the second decoding candidate may have different aggregation levels, different number of decoding candidates for an aggregation level, or different types of control channel.

In aspects, where the downlink control channel is a PDCCH, the eNB may determine the mapping between the first set of possible decoding candidates and the second set of possible decoding candidates based on a number of available CCEs in the subframes of the bundle of subframes. Alternatively, where the downlink control channel is an EPDCCH, the eNB may determine an aggregation level supported in the subframes based on a number of REs available for the EPDCCH in a PRB pair.

In aspects, the downlink control channel may be an EPDCCH configured with a first EPDCCH resource set and a second EPDCCH resource set. The eNB may determine a first mapping within the first EPDCCH resource set and may determine a second mapping within the second EPDCCH resource set.

In aspects, the eNB may determine a first mapping within PDCCH and determining a second mapping within EPDCCH.

In aspects, a configuration of the first subframe of the bundle of subframes may be different from a configuration of the second subframe. The eNB may determine the mapping based on the configuration of the first subframe and the configuration of the second subframe. In aspects, the configuration of the first or second subframe may be a subframe type or a number of symbols for downlink transmission in a subframe.

At 504, the eNB may send the bundle of subframes based, at least in part, on the determination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by various hardware and/or software/firmware component(s) and/or module(s) corresponding to means-plus-function blocks illustrated in the Figures. The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software/firmware module executed by a processor, or in a combination thereof. A software/firmware module may reside in any form of storage medium that is known in the art. Some examples of storage media that may be used include random access memory (RAM), read only memory (ROM), flash memory, EPROM memory, EEPROM memory, phase change memory (PCM), registers, a hard disk, a removable disk, a CD-ROM and so forth. A software/firmware module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software/firmware, or combinations thereof. If implemented in software/firmware, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Software/firmware instructions may also be transmitted over a transmission medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. A method of decoding a downlink control channel transmission that occupies a transmission time interval (TTI) bundle of subframes, comprising:
   determining the TTI bundle of subframes, the TTI bundle of subframes comprising a plurality of consecutive subframes in which the downlink control channel transmission is configured to be repeated with an aggregation level in each of the plurality of consecutive subframes;
   determining at least one downlink control channel decoding candidate having the aggregation level is supported in a first subframe of the TTI bundle of subframes, the first subframe having a regular time division duplex (TDD) subframe configuration or a first special TDD subframe configuration;
   determining the at least one downlink control channel decoding candidate having the aggregation level is not supported in a second subframe of the TTI bundle of subframes, the second subframe having a second special TDD subframe configuration;
   monitoring the at least one downlink control channel decoding candidate in the first subframe based on the regular or first special TDD subframe configuration; and
   ignoring the second subframe for monitoring the at least one downlink control channel decoding candidate based on the second special TDD subframe configuration.

2. The method of claim 1, wherein the downlink control channel comprises a type of physical downlink control channel (PDCCH).

3. The method of claim 1, further comprising:
   determining a mapping for the at least one decoding candidate in the first subframe to a decoding candidate in the second subframe has at least one of different aggregation levels, different number of decoding candidates for an aggregation level, or different types of control channel.

4. The method of claim 3, wherein:
   the downlink control channel is based on an enhanced physical downlink control channel (EPDCCH) configured with a first resource set and a second resource set, and
   determining the mapping comprises determining a first mapping within the first resource set and a second mapping within the second resource set.

5. The method of claim 3, wherein:
   the monitoring is performed within a common search space and a UE-specific search space; and
   determining the mapping comprises determining a first mapping within the common search space and a second mapping within the UE-specific search space.

6. The method of claim 3, wherein determining the mapping comprises determining a first mapping for a first type of physical downlink control channel (PDCCH) and a second mapping for a second type of PDCCH.

7. The method of claim 1, wherein:
   determining the at least one decoding candidate having an aggregation level supported in the first subframe that is not supported in the second subframe is based on a number of available control channel elements (CCEs) in the first and second subframes.

8. The method of claim 1, wherein:
   determining the at least one decoding candidate having an aggregation level supported in the first subframe that is not supported in the second subframe is based on a number of resource elements (REs) available for the downlink control channel in a physical resource block (PRB) pair.

9. The method of claim 1, further comprising:
   determining a presence of a signal other than the downlink control channel signal in the first and second subframes; wherein
   the monitoring comprises ignoring the at least one decoding candidate for decoding if the other signal is present in that subframe.

10. The method of claim 9, wherein the other signal comprises at least one of: a multimedia broadcast multicast service (MBMS) signal or a positioning reference signal (PRS).

11. The method of claim 1, wherein:
the first TDD special subframe configuration comprises one of special subframe configurations {3, 4, 8}; and
the second special TDD subframe configuration comprises one of special subframe configurations {0,1,2,5, 6,7}.

12. The method of claim 1, wherein the repetitions of the downlink control channel have a same hybrid automatic repeat request (HARQ) process number.

13. A method of transmitting a downlink control channel transmission that occupies a transmission time interval (TTI) bundle of subframes, comprising:
determining the TTI bundle of subframes, the TTI bundle of subframes comprising a plurality of consecutive subframes in which the downlink control channel transmission is configured to be repeated with an aggregation level in each of the plurality of consecutive subframes;
determining at least one downlink control channel decoding candidate having the aggregation level is supported in a first subframe of the TTI bundle of subframes, the first subframe having a regular time division duplex (TDD) subframe configuration or a first special TDD subframe configuration;
determining the at least one downlink control channel decoding candidate having the aggregation level is not supported in a second subframe of the TTI bundle of subframes, the second subframe having a second special TDD subframe configuration; and
transmitting the at least one downlink control channel decoding candidate in the first subframe and not in the second subframe based on the determination.

14. The method of claim 13, wherein the downlink control channel comprises a type of physical downlink control channel (PDCCH).

15. The method of claim 13, wherein:
determining the at least one decoding candidate having an aggregation level supported in the first subframe that is not supported in the second subframe is based on a number of available control channel elements (CCEs) in the first and second subframes.

16. The method of claim 13, wherein:
determining the at least one decoding candidate having an aggregation level supported in the first subframe that is not supported in the second subframe is based on a number of resource elements (REs) available for the downlink control channel in a physical resource block (PRB) pair.

17. The method of claim 13, wherein:
the downlink control channel is based on an enhanced physical downlink control channel (EPDCCH) configured with a first resource set and a second resource set, and
determining the mapping comprises determining a first mapping within the first resource set and a second mapping within the second resource set.

18. The method of claim 13, wherein:
determining the mapping comprises determining a first mapping for a first type of physical downlink control channel (PDCCH) and a second mapping for a second type of PDCCH.

19. The method of claim 13, wherein:
the first TDD special subframe configuration comprises one of special subframe configurations {3, 4, 8}; and
the second special TDD subframe configuration comprises one of special subframe configurations {0,1,2,5, 6,7}.

20. The method of claim 13, wherein the repetitions of the downlink control channel have a same hybrid automatic repeat request (HARQ) process number.

21. An apparatus for processing a downlink control channel transmission that occupies a transmission time interval (TTI) bundle of subframes, comprising:
means for determining the TTI bundle of subframes, the TTI bundle of subframes comprising a plurality of consecutive subframes in which the downlink control channel transmission is configured to be repeated with an aggregation level in each of the plurality of consecutive subframes;
means for determining at least one downlink control channel decoding candidate having the aggregation level is supported in a first subframe of the TTI bundle of subframes, the first subframe having a regular time division duplex (TDD) subframe configuration or a first special TDD subframe configuration;
means for determining the at least one downlink control channel decoding candidate having the aggregation level is not supported in a second subframe of the TTI bundle of subframes, the second subframe having a second special TDD subframe configuration;
means for monitoring the at least one downlink control channel decoding candidate in the first subframe based on the regular or first special TDD subframe configuration; and
means for ignoring the second subframe for monitoring the at least one downlink control channel decoding candidate based on the second special TDD subframe configuration.

22. The apparatus of claim 21, wherein:
the first TDD special subframe configuration comprises one of special subframe configurations {3, 4, 8}; and
the second special TDD subframe configuration comprises one of special subframe configurations {0,1,2,5, 6,7}.

23. An apparatus for transmitting a downlink control channel transmission that occupies a transmission time interval (TTI) bundle of subframes, comprising:
means for determining the TTI bundle of subframes, the TTI bundle of subframes comprising a plurality of consecutive subframes in which the downlink control channel transmission is configured to be repeated with an aggregation level in each of the plurality of consecutive subframes;
means for determining at least one downlink control channel decoding candidate having the aggregation level is supported in a first subframe of the TTI bundle of subframes, the first subframe having a regular time division duplex (TDD) subframe configuration or a first special TDD subframe configuration;
means for determining the at least one downlink control channel decoding candidate having the aggregation level is not supported in a second subframe of the TTI bundle of subframes, the second subframe having a second special TDD subframe configuration; and
means for transmitting the at least one downlink control channel decoding candidate in the first subframe and not in the second subframe based on the determination.

24. The apparatus of claim 23, wherein:
the first TDD special subframe configuration comprises one of special subframe configurations {3, 4, 8}; and
the second special TDD subframe configuration comprises one of special subframe configurations {0,1,2,5,6,7}.

25. An apparatus for decoding a downlink control channel transmission that occupies a transmission time interval (TTI) bundle of subframes, comprising:
at least one processor; and
memory coupled to the at least one processor, the memory comprising code executable by the at least one processor to cause the apparatus to:
determine the TTI bundle of subframes, the TTI bundle of subframes comprising a plurality of consecutive subframes in which the downlink control channel transmission is configured to be repeated with an aggregation level in each of the plurality of consecutive subframes;
determine at least one downlink control channel decoding candidate having the aggregation level is supported in a first subframe of the TTI bundle of subframes, the first subframe having a regular time division duplex (TDD) subframe configuration or a first special TDD subframe configuration;
determine the at least one downlink control channel decoding candidate having the aggregation level is not supported in a second subframe of the TTI bundle of subframes, the second subframe having a second special TDD subframe configuration;
monitor the at least one downlink control channel decoding candidate in the first subframe based on the regular or first special TDD subframe configuration; and
ignore the second subframe for monitoring the at least one downlink control channel decoding candidate based on the second special TDD subframe configuration.

26. An apparatus for transmitting a downlink control channel transmission that occupies a transmission time interval (TTI) bundle of subframes, comprising:
at least one processor; and
memory coupled to the at least one processor, the memory comprising code executable by the at least one processor to cause the apparatus to:
determine the TTI bundle of subframes, the TTI bundle of subframes comprising a plurality of consecutive subframes in which the downlink control channel transmission is configured to be repeated with an aggregation level in each of the plurality of consecutive subframes;
determine at least one downlink control channel decoding candidate having the aggregation level is supported in a first subframe of the TTI bundle of subframes, the first subframe having a regular time division duplex (TDD) subframe configuration or a first special TDD subframe configuration;
determine the at least one downlink control channel decoding candidate having the aggregation level is not supported in a second subframe of the TTI bundle of subframes, the second subframe having a second special TDD subframe configuration; and
transmit the at least one downlink control channel decoding candidate in the first subframe and not in the second subframe based on the determination.

27. A non-transitory computer-readable medium for an apparatus for decoding a downlink control channel transmission that occupies a transmission time interval (TTI) bundle of subframes, comprising:
code executable by at least one processor to cause the apparatus to:
determine the TTI bundle of subframes, the TTI bundle of subframes comprising a plurality of consecutive subframes in which the downlink control channel transmission is configured to be repeated with an aggregation level in each of the plurality of consecutive subframes;
determine at least one downlink control channel decoding candidate having the aggregation level is supported in a first subframe of the TTI bundle of subframes, the first subframe having a regular time division duplex (TDD) subframe configuration or a first special TDD subframe configuration;
determine the at least one downlink control channel decoding candidate having the aggregation level is not supported in a second subframe of the TTI bundle of subframes, the second subframe having a second special TDD subframe configuration;
monitor the at least one downlink control channel decoding candidate in the first subframe based on the regular or first special TDD subframe configuration; and
ignore the second subframe for monitoring the at least one downlink control channel decoding candidate based on the second special TDD subframe configuration.

28. A non-transitory computer-readable medium for an apparatus for transmitting a downlink control channel transmission that occupies a transmission time interval (TTI) bundle of subframes, comprising:
code executable by at least one processor to cause the apparatus to:
determine the TTI bundle of subframes, the TTI bundle of subframes comprising a plurality of consecutive subframes in which the downlink control channel transmission is configured to be repeated with an aggregation level in each of the plurality of consecutive subframes;
determine at least one downlink control channel decoding candidate having the aggregation level is supported in a first subframe of the TTI bundle of subframes, the first subframe having a regular time division duplex (TDD) subframe configuration or a first special TDD subframe configuration;
determine the at least one downlink control channel decoding candidate having the aggregation level and that is not supported in a second subframe of the TTI bundle of subframes, the second subframe having a second special TDD subframe configuration; and
transmit the at least one downlink control channel decoding candidate in the first subframe and not in the second subframe based on the determination.

* * * * *